Dec. 15, 1936.  J. E. SMITH  2,064,389
UNIT HEATER
Filed Nov. 3, 1932  2 Sheets-Sheet 1
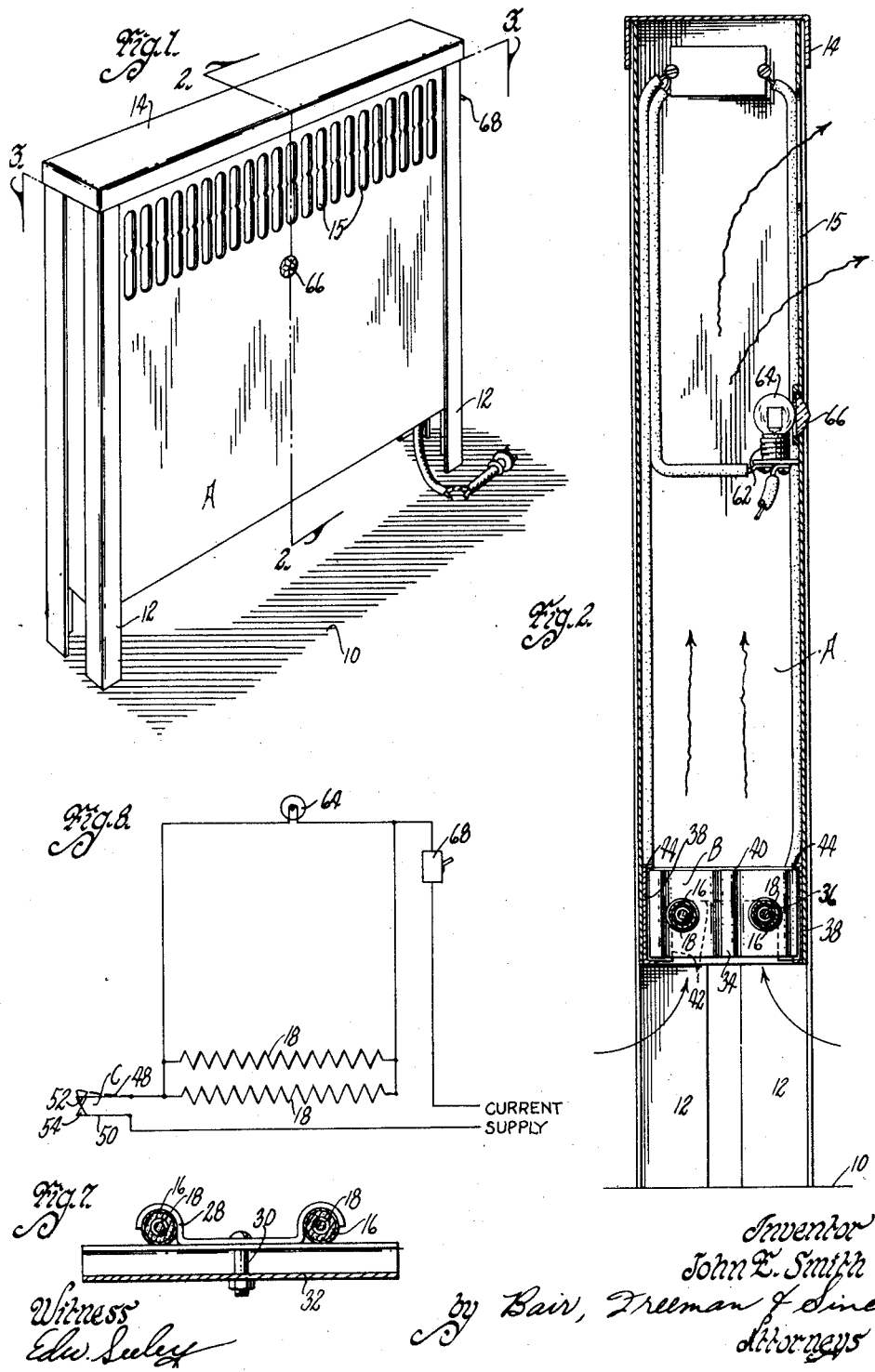
Inventor
John E. Smith
by Bair, Freeman & Sinclair
Attorneys
Witness
Edw. Seeley

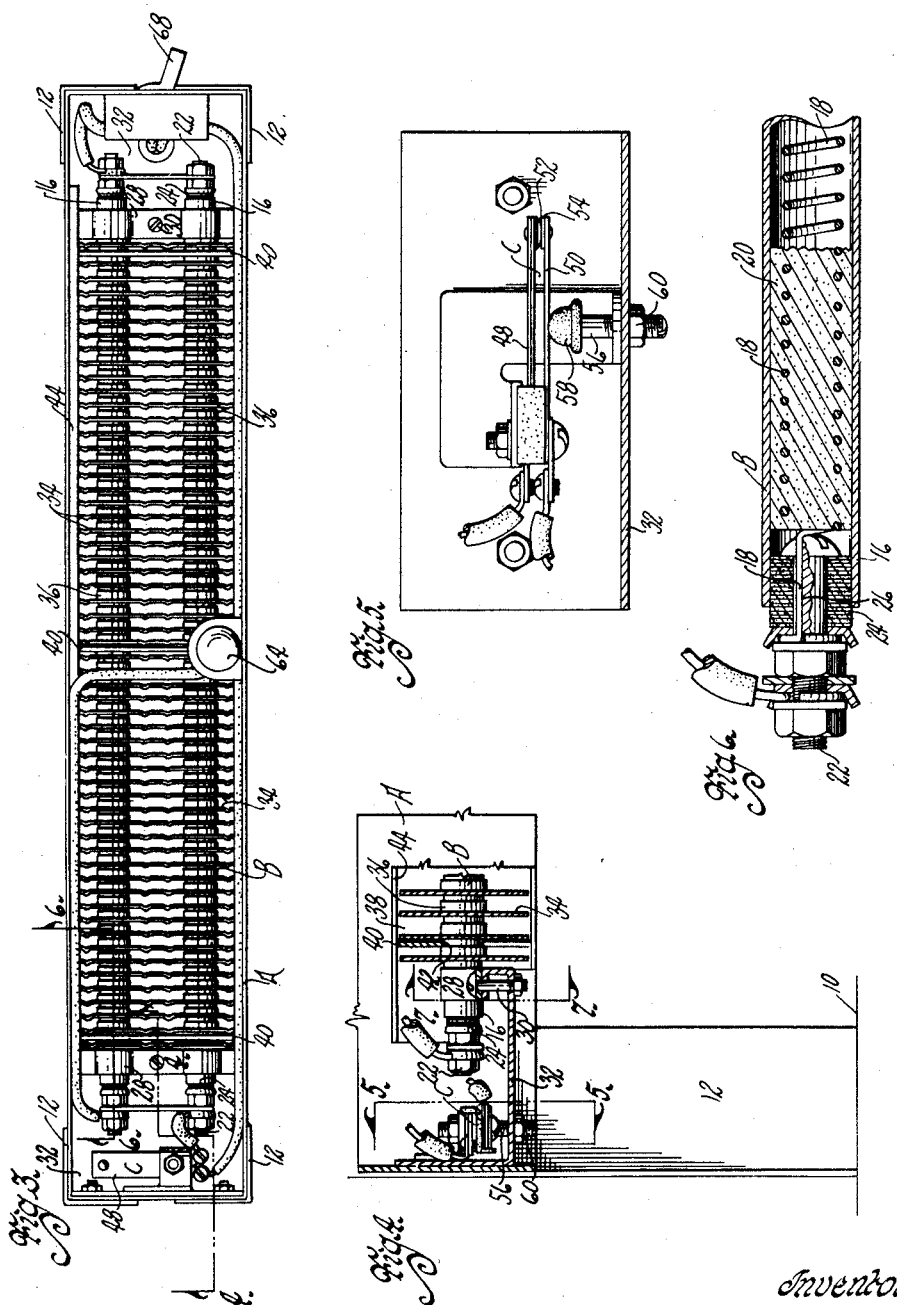

Patented Dec. 15, 1936

2,064,389

UNITED STATES PATENT OFFICE 2,064,389

UNIT HEATER

John E. Smith, Belleville, Ill., assignor to Knapp-Monarch Company, Belleville, Ill., a corporation of Missouri Application November 3, 1932, Serial No. 641,014

2 Claims. (Cl. 219—38)

The object of my invention is to provide a unit heater which is simple, durable and comparatively inexpensive to manufacture.

A further object is to provide a unit heater comprising an upright casing with electrically energized heating means therein for heating air, the casing being open at its bottom so that air can circulate thereinto whereupon it will be heated and will circulate upwardly, the side of the casing having discharged openings for it to circulate out through into the room in which the unit heater is positioned.

Still a further object is to provide an electric heater of radiator-like appearance, it being formed of a casing having discharge openings in one side and adjacent the top thereof, means being provided for introducing air into the casing and heating it before it is discharged through said openings.

Still a further object is to provide a heating element in the unit heater which comprises a pair of rod-like, electric heating units, spaced vertical fins being provided along the heating units for more readily radiating heat from the heating units to the air being circulated through the device.

Still a further object is to provide a thermostatic switch for automatically controlling the energization and de-energization of the electric heating element, a signal light being provided to indicate whether or not the heating element is energized and being discernible through a lens in the side of the casing.

Still a further object is to provide frictional mounting means for the ends of the electric heating elements so that they can expand relative to the casing of the device.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a unit heater embodying my invention.

Figure 2 is an enlarged vertical sectional view on the line 2—2 of Figure 1.

Figure 3 is a horizontal sectional view on the line 3—3 of Figure 1 showing the parts on an enlarged scale.

Figure 4 is a sectional view on the line 4—4 of Figure 3.

Figure 5 is a sectional view on the line 5—5 of Figure 4 showing a thermostatic switch for automatically controlling the heating elements.

Figure 6 is an enlarged sectional view on the line 6—6 of Figure 3.

Figure 7 is a sectional view on the line 7—7 of Figure 4; and

Figure 8 is an electric diagram of the wiring of the unit heater.

On the accompanying drawings, I have used the reference character A to indicate generally a casing. The casing A is open at its lower end as shown in Figure 2 and is spaced above a floor surface 10 by supporting legs 12.

The upper end of the casing is open but a removable cover 14 is provided therefor. In one side of the casing, discharge openings 15 are provided.

Within the casing A, I provide a pair of heating elements B. Each one comprises a tubular metal casing 16 having a resistance coil 18 therein insulated by argillous material 20, for instance, which is originally inserted into the casing 16 in a plastic state.

A terminal 22 is provided for each end of each heating element B. The terminals 22 are insulated from the casing 16 by sleeves 24 of insulation. The end of each resistance wire 18 extends through a longitudinal slot 26 of its particular terminal screw 22 in order to pass through the bushing 24. This is more fully disclosed in my copending application Serial No. 641,016, filed November 3, 1932.

The heating elements B are supported frictionally by clamp bars 28. The clamp bars 28 are secured by bolts 30 to supporting plates 32 (see Figure 7). A frictional mounting of this character permits expansion and contraction of the heating elements B without undue strain.

Threaded on the heating elements B are radiation fins 34. Each one has a pair of hubs 36 to encircle the heating elements. These retain the fins in their proper position at right angles to the heating elements B.

Side members 38 are provided for the fins 34. The side members 38 are secured to the ends of three supporting members 40 which are notched as indicated at 42 to fit over the heating elements B. The side members 38 are provided with flanges 44 slightly overlapping the edges of the fins 34.

The combination of heating elements B, fins 34, side members 38 and supports 40 provides a heating unit which can be readily inserted in or removed from the casing A. Only the two bolts 30 are necessary to hold this unit in its proper position.

Within the casing A adjacent the lower part thereof and preferably adjacent one end of the heating elements B, I provide a thermostatic switch C. The switch C comprises a bimetal arm 48 and a spring arm 50 carrying coacting contacts 52 and 54, respectively. An adjusting screw 56 having an insulated head 58 and a lock nut 60 is shown in Figure 5. The screw can be manipulated to adjust the spring 50 and thereby the position of the contact 54 for requiring more or less predetermined heat to open the thermostatic switch C.

Within the casing A, I provide a signal light socket 62. A signal light 64 is mounted within the socket and a lens 66 is mounted in the wall of the casing A through which the signal light 64 is discernible. The signal light 64 is preferably of the neon type.

Referring to Figure 8, it will be noted that the heating elements B and the signal light 64 are connected in parallel with each other and all are connected in series with the thermostatic switch C. Thus when a predetermined degree of heat is reached within the casing A, the thermostatic switch opens for de-energizing the heating elements and at the same time the light 64 is extinguished whereby to indicate the action of the thermostat.

I preferably provide a switch 68 which is manually controlled. It is mounted on one end of the casing A.

In the operation of the device, the switch 68 may be turned to the "on" position whereupon the heating elements B, the signal light 64 and the thermostatic switch C will be energized. Upon the interior of the casing A reaching a predetermined temperature, the bimetal arm 48 will move to the dotted line position of Figure 8 for opening the circuit until the heating unit has cooled down to a point where the contact 52 on the bimetal arm will again engage the contact 54 for re-establishing the heating circuit.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a unit heater, an upright casing, inlet and outlet openings at the top and bottom thereof, a heating element in said casing comprising a tube-like heating member and a plurality of fins threaded thereon, an electric heating element encased in said heating member and means for confining said fins within said casing comprising a channel shaped member along each side of the casing, the ends of the fins fitting between the flanges thereof.

2. In a unit heater, a casing, a heating element in said casing comprising a tube-like member and a plurality of fins threaded thereon, an electric heating element encased in said heating member and means for confining said fins within said casing against vertical movement relative thereto comprising a pair of channel-shaped members supported by said casing, the ends of said fins loosely fitting between the flanges thereof and thereby movable individually, horizontally relative thereto.

JOHN E. SMITH.